(12) United States Patent
Moriarty et al.

(10) Patent No.: US 6,312,644 B1
(45) Date of Patent: Nov. 6, 2001

(54) FLUORESCENT MONOMERS AND POLYMERS CONTAINING SAME FOR USE IN INDUSTRIAL WATER SYSTEMS

(75) Inventors: Barbara E. Moriarty, Palatine; Mingli Wei, Naperville; John E. Hoots, St. Charles; David P. Workman; Jeffrey P. Rasimas, both of Naperville, all of IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/465,146

(22) Filed: Dec. 16, 1999

(51) Int. Cl.[7] ............... C23F 11/10; C02F 5/10; C09K 11/06
(52) U.S. Cl. ............ 422/14; 252/180; 252/301.16; 252/389.1; 252/389.62; 252/393; 252/408.1
(58) Field of Search ............ 422/14; 252/408.1, 252/301.16, 180, 389.1, 389.62, 393

(56) References Cited

U.S. PATENT DOCUMENTS

| | | | |
|---|---|---|---|
| 4,783,314 | 11/1988 | Hoots et al. | 422/3 |
| 4,813,973 | 3/1989 | Winnik et al. | |
| 4,844,841 * | 7/1989 | Koller et al. | |
| 4,992,380 | 2/1991 | Moriarty et al. | 422/62 X |
| 4,999,456 | 3/1991 | Fong | |
| 5,043,406 | 8/1991 | Fong | |
| 5,128,419 | 7/1992 | Fong et al. | |
| 5,171,450 | 12/1992 | Hoots | 422/16 X |
| 5,216,086 | 6/1993 | Fong et al. | |
| 5,260,386 | 11/1993 | Fong et al. | |
| 5,635,576 | 6/1997 | Foll et al. | |

FOREIGN PATENT DOCUMENTS 0 485 882 A1  5/1992 (EP).

OTHER PUBLICATIONS

Kriechbaum, Manfred et al. Evaluation of critical micelle concentrations of non–ionic detergents using new superpolar lipid probes. 1987, vol. 44, No. 1, pp. 19–29 (Abstract Only).
Registry No. 110995–88–5. Structure of 1,3,6–Pyrenetrisulfonic acid, 9–(decyloxy)–, trisodium salt, prior to filing date.
Registry No. 115787–92–3. Structure of 1,3,6–Pyrenetrisulfonic acid, 8–(dodecyloxy)–, trisodium salt, prior to filing date.
Registry No. 115787–91–2. Structure of 1,3,6–Pyrenetrisulfonic acid, 8–ethoxy–, trisodium salt, prior to filing date.

\* cited by examiner

Primary Examiner—Elizabeth McKane
(74) Attorney, Agent, or Firm—Margaret M. Brumm; Thomas M. Breininger

(57) ABSTRACT

Fluorescent monomers of the formula

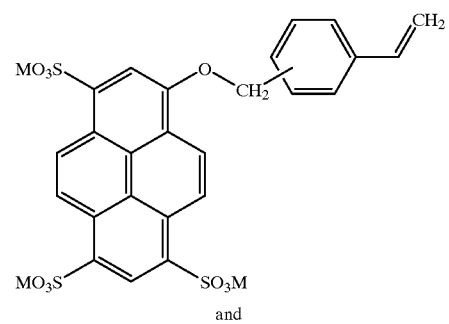

and

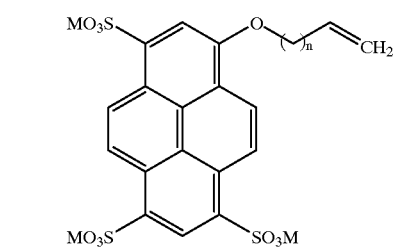

wherein M is selected from the group consisting of hydrogen, sodium, potassium, cesium, rubidium, lithium and ammonium, and n is selected from the group consisting of 1, 2, 3, 4, 6 and 9;

are provided which are useful in the production of pyranine-tagged polymers which can be detected using a fluorometer and can be used in industrial water systems as treatment polymers.

17 Claims, No Drawings

FLUORESCENT MONOMERS AND POLYMERS CONTAINING SAME FOR USE IN INDUSTRIAL WATER SYSTEMS

FIELD OF THE INVENTION

This invention relates generally to the field of fluorescent monomers and polymers made with them. These polymers incorporating fluorescent monomers are useful in industrial water systems.

BACKGROUND OF THE INVENTION

There are many industrial water systems, including, but not limited to, cooling water systems and boiler water systems. Because water resources are becoming limited and efficient utilization of water is required, various methods have been adopted to reduce the amount of water used.

As the methods for reducing the amount of water are put into practice, unfavorable events occur, such as the occurrence of corrosion and the formation of scale, because the quality of the water in the system is progressively deteriorated.

To prevent or minimize these troubles, various kinds of treatment agents for treatment of water systems have been used. It has been found that organic substances, including certain types of treatment polymers, are effective for preventing formation of scale and suppressing the occurrence of corrosion. These certain types of treatment polymers are known to persons of ordinary skill in the art of industrial water treatment and are widely used by themselves or as one of many possible components in scale and corrosion inhibition products. Such treatment polymers generally exhibit activity against scale and corrosion when added to water in an amount in the range of from about 1 to about 100 milligrams of solid component active per liter of water.

When a treatment polymer is used for preventing formation of scale and suppressing the occurrence of corrosion, the concentration of the treatment polymer in the water system is the important factor to perform the desired function with good efficiency. For example, a treatment polymer added to a cooling water system can be consumed by many causes. With consumption, the amount of the treatment polymer dissolved in the cooling water does not remain the same as the amount added to the cooling water. Therefore, it is important for the optimum operation of an industrial water system that practical methods are known to determine the concentration of treatment polymers in the water of the industrial water system.

In general practice, the amount of the treatment polymer added to the water in an industrial water system can be measured using various analytical methods. The use of an inert fluorescent tracer or mass balance measurement method as described in U.S. Pat. Nos. 4,783,314; 4,992,380; and 5,171,450, hereby incorporated by reference, to perform this analysis, is known in the art.

In the inert fluorescent tracer method, an inert fluorescent tracer is added to an industrial water system, with the amount of inert fluorescent tracer added being proportional to the amount of the treatment polymer added. By using a fluorometer to measure the fluorescent signal of the inert fluorescent tracer, the amount of the inert fluorescent tracer can be determined by using a calibration curve to relate the amount of fluorescent signal detected to the amount of the inert fluorescent tracer present. Because the inert fluorescent tracer and the treatment polymer are added to the industrial water system in known proportions, by knowing the amount of inert fluorescent tracer present it also means that the amount of treatment polymer present is known.

The inert fluorescent tracer method can be conducted on-line in real time so that any changes in the amount of treatment polymer being added to the system can be made immediately.

As a complement to the use of an inert tracer system, it has been found that treatment polymers to be used as components of scale and corrosion inhibitors in industrial water systems could be monitored if tagged with a fluorescent monomer. The amount of fluorescent monomer incorporated into the polymer must be enough so that the fluorescence of the polymer can now be adequately measured, however, it must not be so much that the performance of the polymer as a treatment agent for the water is decreased. Because the concentration of the tagged treatment polymer itself can be determined using a fluorometer, it is now possible to measure consumption of the treatment polymer directly. It is important to be able to measure consumption directly because consumption of a treatment polymer usually indicates that a non-desired event, such as scaling, is occurring. Thus by being able to measure consumption of the polymeric additive, there can be achieved an on-line, real time in situ measurement of scaling activity in the cooling system.

Certain tagged polymers are known, see U.S. Pat. No. 5,986,030, hereby incorporated by reference. However, there is not an abundance of viable tagged polymers for use in industrial water systems. Therefore, it is desirable to provide additional tagged polymers that have a fluorescent signal so that you can use a fluorometer to measure the fluorescent signal of the tagged treatment polymer and determine the concentration of tagged treatment polymer currently present in the industrial water system from that information.

It is known that tagging of polymers is difficult to accomplish because of the difficulty in chemically combining fluorescent moieties with non-fluorescent polymers. In order to synthesize tagged treatment polymers it is also desirable to provide fluorescent monomers that are readily polymerized to form tagged treatment polymers.

The aspects, objects and the several advantages of this invention will be apparent from the following specification and appended claims.

SUMMARY OF THE INVENTION

The first aspect of the instant claimed invention are fluorescent monomers selected from the group consisting of compounds having the formula of:

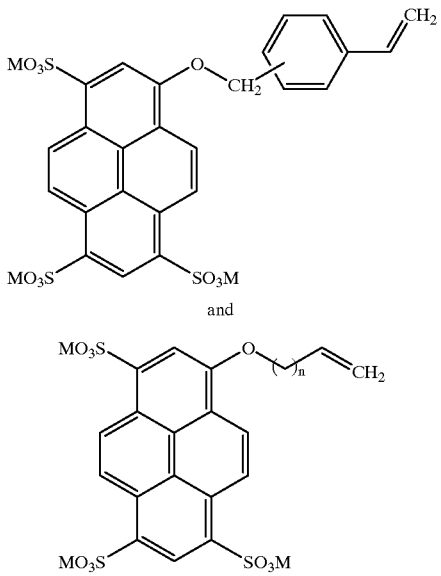

and

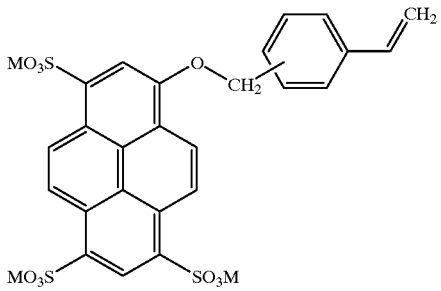

wherein M is selected from the group consisting of hydrogen, sodium, potassium, cesium, rubidium, lithium and ammonium, and n is selected from the group consisting of 1, 2, 3, 4, 6 and 9.

The second aspect of the instant claimed invention is a process for the preparation of 8-(3- or 4-vinylbenzyloxy)-1,3,6-pyrene trisulfonic acid comprising reacting pyranine with either 3- or 4-vinylbenzyl chloride in an organic solvent selected from the group consisting of methanol, dimethyl formamide, methyl pyrrolidinone and dimethylsulfoxide.

The third aspect of the instant claimed invention is a process for the preparation of 8-(allyloxy)-1,3,6-pyrene trisulfonic acid which comprises reacting pyranine with allyl chloride in an organic solvent selected from the group consisting of methanol, dimethyl formamide, methyl pyrrolidinone and dimethylsulfoxide.

The fourth aspect of the instant claimed invention is a fluorescent pyranine-tagged polymer selected from the group consisting of:

$$A_x B_y \qquad \mathrm{I})$$

where x+y=100; where

A is a fluorescent monomer selected from the group consisting of compounds of the formula:

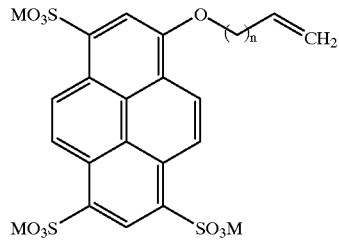

-continued and wherein M is selected from the group consisting of hydrogen, sodium, potassium, cesium, rubidium, lithium and ammonium, and n is selected from the group consisting of 1, 2, 3, 4, 6 and 9;

x is from about 0.001 to about 1 mol %; and

B is selected from the group consisting of acrylic acid and salts, methacrylic acid and salts, maleic acid and salts, maleic anhydride, acrylamide, crotonic acid and salts, and y is from about 99.000 to about 99.999 mol %;

$$A_x B_j C_k \qquad \mathrm{II})$$

where x+j+k=100;

A is as defined above; x is from about 0.001 to about 1 mol %;

B is as defined above; j is from about 1 to about 98 mol %; and

C is selected from the group consisting of methacrylic acid and salts, maleic acid and salts, maleic anhydride, crotonic acid and salts, itaconic acid and salts, acrylamide, methacrylamide, 2-acrylamido-2-methylpropanesulfonic acid and salts, polyethylene glycol monomethacrylate, vinyl phosphonic acid and salts, styrene sulfonic acid and salts, vinyl sulfonic acid and salts, 3-allyloxy-2-hydroxypropane sulfonic acid and salts, N-alkyl (meth)acrylamide, t-butyl (meth)acrylate, N-alkyl (meth)acrylate, N-alkanol-N-alkyl (meth)acrylate, vinyl acetate, 2-Hydroxy N-alkyl (meth)acrylate, alkyl vinyl ether, alkoxyethyl acrylate, N-alkanol (meth)acrylamide, N,N-dialkyl(meth)acrylamide and 1-vinyl-2-pyrrolidinone;

k is from about 1.999 to about 98 mol %;

$$A_x B_m D_q \qquad \mathrm{III})$$

where x+m+q=100;

A is as defined above; x is from about 0.001 to about 1 mol %;

B is as defined above; m is from about 1 to about 95 mol %;

D is selected from the group consisting of sulfomethylacrylamide and sulfoethylacrylamide; q is from about 4.999 to about 40 mol %; and $$A_x B_r C_s D_t \qquad \mathrm{IV})$$

where x+r+s+t=100;

A is as defined above; x is from about 0.001 to about 1 mol %;

B is as defined above; r is from about 1 to about 89.999 mol %;

C is as defined above; s is from about 1 to about 89.999 mol %;

D is as defined above; t is from about 5 to about 40 mol %;

The fifth aspect of the instant claimed invention is the use of the fluorescent pyranine-tagged polymer previously described as a water-soluble polymeric treatment agent.

The sixth aspect of the instant claimed invention is a method for maintaining the desired amount of fluorescent pyranine-tagged polymer in an industrial water system comprising the steps of:

a) adding the previously described pyranine-tagged polymer to the water of an industrial water system such that a desired concentration of said pyranine-tagged polymer is present in said water, b) using a fluorometer to detect the fluorescent signal of said pyranine-tagged polymer;

c) converting the fluorescent signal of said pyranine-tagged polymer to the concentration of said pyranine-tagged polymer;

d) adjusting the concentration of said pyranine-tagged polymer according to what the desired concentration is for said pyranine-tagged polymer in the industrial water system.

The seventh aspect of the instant claimed invention is a method for maintaining the desired amount of pyranine-tagged polymer in an industrial water system comprising the steps of:

a) adding an inert tracer and a pyranine-tagged polymer previously described to the water of an industrial water system such that a desired concentration of said pyranine-tagged polymer is present in said water, b) using a fluorometer to detect the fluorescent signals of the inert tracer and the pyranine-tagged polymer;

c) converting the fluorescent signals of the inert tracer and the pyranine-tagged polymer to the concentration of the inert tracer and the pyranine-tagged polymer;

d) adjusting the concentration of said pyranine-tagged polymer according to what the desired concentration is for said pyranine-tagged polymer in the industrial water system.

DETAILED DESCRIPTION OF THE INVENTION

The present invention is based upon the discovery of certain fluorescent monomers prepared from pyranine. These fluorescent monomers are useful in the preparation of tagged polymers. These tagged polymers can be used as treatment polymers in industrial water systems.

The fluorescent monomers of the instant claimed invention are selected from the group consisting of compounds of the formula:

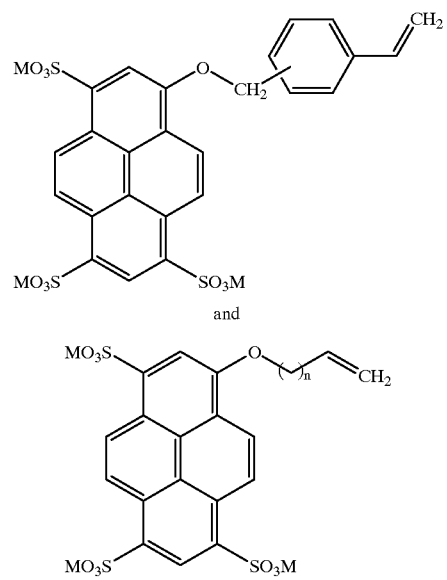

wherein M is selected from the group consisting of hydrogen, sodium, potassium, cesium, rubidium, lithium and ammonium, and n is selected from the group consisting of 1, 2, 3, 4, 6 and 9.

Preferably M is selected from the group consisting of hydrogen, sodium and potassium. More preferably, M is selected from the group consisting of sodium and potassium.

Preferably the fluorescent monomers are selected from the group consisting of 8-(3-vinylbenzyloxy)-1,3,6-pyrene trisulfonic acid, 8-(4-vinylbenzyloxy)-1,3,6-pyrene trisulfonic acid and 8-(allyloxy)-1,3,6-pyrene trisulfonic acid and the sodium, potassium, cesium, rubidium, lithium and ammonium salts thereof. Thus, the terms vinyl benzyl pyranine and allyl pyranine and the abbreviations VBP and AP, as used herein, mean: 8-(3-vinylbenzyloxy)-1,3,6-pyrene trisulfonic acid (3-VBP), 8-(4-vinylbenzyloxy)-1,3,6-pyrene trisulfonic acid (4-VBP) and 8-(allyloxy)-1,3,6-pyrene trisulfonic acid (AP) including the sodium, potassium, cesium, rubidium, lithium and ammonium salts thereof. Other abbreviations used in this patent application are:

AA for acrylic acid,

AcAm for acrylamide, and

SMA for sulfomethacrylamide.

The fluorescent monomers of the instant claimed invention can be synthesized through the reaction of pyranine, also known as 8-hydroxy-1,3,6-pyrene trisulfonic acid (available from Lancaster Synthesis Inc., P.O. Box 1000, Windham, N.H. 03087-9977, telephone number (800) 230-0372), and an alkylating agent such as 3-vinylbenzyl chloride, 4-vinylbenzyl chloride, a mixture of 3- and 4-vinyl benzyl chloride, allyl chloride (or allyl bromide) for n=1; 4-bromo-1-butene, for n=2; 5-bromo-1-pentene, for n=3; 6-bromo-1-hexene, for n=4; 8-bromo-1-octene, for n=6; and 11-bromo-1-undecene, for n=9. All of these alkylating agents are available from Aldrich Chemical Company, P.O. Box 2060, Milwaukee, Wis. 53201 USA; Telephone Numbers (414) 273-3850 and (800) 558-9160. In addition to Aldrich as a source, the mixture of 3-vinyl benzyl chloride and 4-benzyl chloride is available from The Dow Chemical Company, 2020 Dow Center, Midland Mich. 48686-0440, telephone numbers (517) 496-4000.

The reaction can be accomplished in a polar organic solvent. A stoichiometrical amount of base is used to deprotonate the pyranine. A slight excess of alkylating agent is preferably used to ensure complete conversion of pyranine to the desired monomer.

Although many organic solvents such as dimethyl sulfoxide (hereinafter "DMSO"), methanol, dimethylformamide and methyl pyrrolidinone can be used in the reaction, reaction in DMSO is preferred since it gives near quantitative yield even at typical room temperatures of from about 20° C. to about 25° C. Higher reaction temperatures can be used to shorten the reaction time. Generally the reaction is carried out at a temperature in the range of about 20° C. to about 60° C. for a period of time in the range of about 3 to about 10 hours.

The product can be collected by stripping off the solvent under reduced pressure. Alternatively, the product can be isolated by precipitation into acetone and recovery of the yellow solid. Further purification, to remove residual solvent, can be accomplished by washing or stirring the crude product with acetone or isopropanol followed by filtration.

After preparation and isolation of the fluorescent monomer, fluorescent pyranine-tagged polymers containing these fluorescent monomers can be prepared by inclusion of the fluorescent monomer into a base polymer.

The amount of fluorescent monomer that is used should be an amount sufficient to allow the polymer to be detected in the aqueous environment that it is used. The minimum amount of fluorescent moiety that can be used is that amount which gives a signal-to-noise ratio (S/N) of 3 at the desired polymer dosage. The signal-to-noise ratio is that value where the magnitude of the transduced signal (including but not limited to electronic and optical signals) due to the presence of a target analyte in a measurement device is greater than or equal to a level three (3) times the magnitude of a transduced signal where the analyte (species) of interest is not present in the measurement device.

The amount of fluorescent monomer in the tagged polymers is in the range of from about 0.01 wt. percent to about 10.0 wt. percent, preferably from about 0.1 wt. percent to about 2 wt. percent, and most preferably from about 0.25 wt. percent to about 1.0 weight percent. (When mol percents are given in this patent application it is understood that these are calculated mol percents, not measured. The weight percents were measured and converted to mol percents. The conversion used was 1.0 wt. % VBP=0.11 mol % VPP, and 1.0 wt. % AP=0.13 mol % AP.)

The remainder of the polymer can have one, two or three additional monomers in it.

For purposes of this patent application the subscripts x, y, j, k, m, q, r, s and t refer to the mole percent of each component of the polymers. The polymers are selected from the group consisting of:

$$A_x B_y \quad \text{I)}$$

where x+y=100; where

A is a fluorescent monomer selected from the group consisting of compounds of the formula:

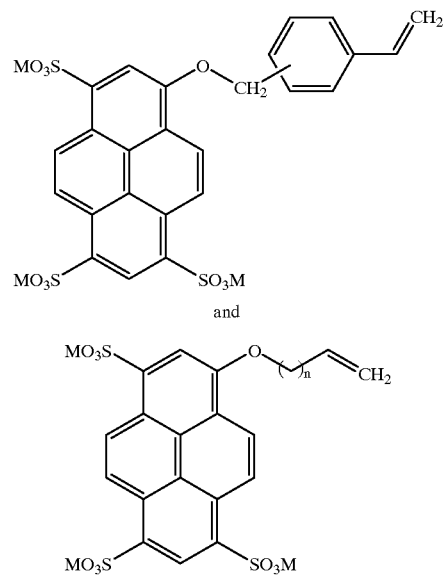

and wherein M is selected from the group consisting of hydrogen, sodium, potassium, cesium, rubidium, lithium and ammonium, and n is selected from the group consisting of 1, 2, 3, 4, 6 and 9;

x is from about 0.001 to about 1 mol %; and

B is selected from the group consisting of acrylic acid and salts, methacrylic acid and salts, maleic acid and salts, maleic anhydride, acrylamide, crotonic acid and salts, and y is from about 99.000 to about 99.999 mol %;

$$A_x B_j C_k \quad \text{II)}$$

where x+j+k=100;

A is as defined above; x is from about 0.001 to about 1 mol %;

B is as defined above; j is from about 1 to about 98 mol %; and

C is selected from the group consisting of methacrylic acid and salts, maleic acid and salts, maleic anhydride, crotonic acid and salts, itaconic acid and salts, acrylamide, methacrylamide, 2-acrylamido-2-methylpropanesulfonic acid and salts, polyethylene glycol monomethacrylate, vinyl phosphonic acid and salts, styrene sulfonic acid and salts, vinyl sulfonic acid and salts, 3-allyloxy-2-hydroxypropane sulfonic acid and salts, N-alkyl (meth)acrylamide, t-butyl (meth) acrylate, N-alkyl (meth)acrylate, N-alkanol-N-alkyl (meth)acrylate, vinyl acetate, 2-Hydroxy N-alkyl (meth)acrylate, alkyl vinyl ether, alkoxyethyl acrylate, N-alkanol (meth)acrylamide, N,N-dialkyl(meth) acrylamide and 1-vinyl-2-pyrrolidinone;

k is from about 1.999 to about 98 mol %;

$$A_x B_m D_q \quad \text{III)}$$

where x+m+q=100;

A is as defined above; x is from about 0.001 to about 1 mol %;

B is as defined above; m is from about 1 to about 95 mol %;

D is selected from the group consisting of sulfomethylacrylamide and sulfoethylacrylamide; q is from about 4.999 to about 40 mol %; and $$A_x B_r C_s D_t \qquad \text{IV)}$$

where x+r+s+t=100;

A is as defined above; x is from about 0.001 to about 1 mol %;

B is as defined above; r is from about 1 to about 89.999 mol %;

C is as defined above; s is from about 1 to about 89.999 mol %;

D is as defined above; t is from about 5 to about 40 mol %;

All molecular weights in this patent application are weight average molecular weights. The weight average molecular weight of these polymers is from about 500 atomic mass units (hereinafter "a.m.u.") to about 200,000 a.m.u. . Preferably the molecular weight is from about 2000 a.m.u. to about 100,000 a.m.u. Most preferably, the molecular weight is from about 5000 a.m.u. to about 40,000 a.m.u.

The weight average molecular weight was measured using gel permeation chromatography using polystyrene sulfonate molecular weight standards. The columns used were Micra™ GPC 500+GPC 100. The mobile phase was 70/30 water/acetonitrile containing 0.15M ammonium formate (to reduce sticking of the small amount of highly aromatic unreacted fluorescent monomer).

Labeling of the polymer through the use of the fluorescent monomers of this invention is achieved by synthesizing the polymer in the presence of the fluorescent monomer.

The polymerization is generally carried out in an aqueous or mixed aqueous solution through the copolymerization of one of the fluorescent monomers with one or more water soluble ethylenically unsaturated monomers. Various polymer initiators can be used in the polymerization including thermal and redox initiators.

One method of polymerization is as follows: 0.25 to 1.0 weight percent of the fluorescent monomer, based on total monomer, is dissolved in monomer solution consisting of the other monomers. The monomer solution is adjusted to a pH of about 5 by addition of a 50 percent sodium hydroxide solution. Ammonium persulfate and sodium bisulfite are used as initiating and chain transfer agents. Monomer solution and initiator solutions are added separately into a reactor over a period of 2 hours. The temperature is kept at 60° C.

To make sulfomethylated polymer products, the polymer is further reacted with sodium bisulfite and formaldehyde at elevated temperature to give a sulfomethylated polymer product.

Once created, the fluorescent pyranine-tagged polymers of the instant claimed invention can be used as scale inhibitors in any industrial water system where a scale inhibitor is needed. Industrial water systems, include, but are not limited to, cooling tower water systems (including open recirculating, closed and once-through systems); petroleum wells, downhole formations, geothermal wells and other oil field applications; boilers and boiler water systems; mineral process waters including mineral washing, flotation and benefaction; paper mill digesters, washers, bleach plants and white water systems; black liquor evaporators in the pulp industry; gas scrubbers and air washers; continuous casting processes in the metallurgical industry; air conditioning and refrigeration systems; industrial and petroleum process water; indirect contact cooling and heating water, such as pasteurization water; water reclamation and purification systems; membrane filtration water systems; food processing streams (meat, vegetable, sugar beets, sugar cane, grain, poultry, fruit and soybean); and waste treatment systems as well as in clarifiers, liquid-solid applications, municipal sewage treatment and industrial or municipal water systems.

As stated previously, these fluorescent pyranine-tagged polymers function as scale inhibitors. As these polymers are consumed performing that function, their fluorescent signal will decrease and thus the decrease in the fluorescent signal can be used to indicate that undesired scaling is taking place. The polymer tagged with the fluorescent monomer may be used in the industrial water systems singly or in combination with other polymers, which are not tagged.

The amount of the polymer tagged with the fluorescent monomer added to an industrial water system is in the range of about 1.0 milligrams (mg) to about 30 milligrams of the total solid polymer actives per liter of water in the system. This is equivalent to about 1 part per million (hereinafter "ppm") to about 30 ppm.

When used in an industrial water system, the fluorescent signal of the pyranine-tagged polymers can be used to determine how much polymer is present in the industrial water system. The method to do this is described as follows:

A method for maintaining the desired amount of pyranine-tagged polymer in an industrial water system comprising the steps of:

a) adding a pyranine-tagged polymer to water such that a desired concentration of said pyranine-tagged polymer is present in said water, b) using a fluorometer to detect the fluorescent signal of said pyranine-tagged polymer;

c) converting the fluorescent signal of the polymer to the concentration of said pyranine-tagged polymer;

d) adjusting the concentration of said pyranine-tagged polymer according to what the desired concentration is for said pyranine-tagged polymer in the industrial water system.

An additional method for maintaining the desired amount of pyranine-tagged polymer in an industrial water system is as follows:

A method for maintaining the desired amount of pyranine-tagged polymer in an industrial water system comprising the steps of:

a) adding an inert tracer and a pyranine-tagged polymer to water such that a desired concentration of said pyranine-tagged polymer is present in said water, b) using a fluorometer to detect the fluorescent signals of the inert tracer and the pyranine-tagged polymer;

c) converting the fluorescent signals of the inert tracer and the pyranine-tagged polymer to the concentration of the inert tracer and the pyranine-tagged polymer;

d) adjusting the concentration of said pyranine-tagged polymer according to what the desired concentration is for said pyranine-tagged polymer in the industrial water system.

An advantage of the fluorescent monomers of this invention is that in their use in the formation of a tagged polymer, the fluorescent monomer is not significantly affected by other structures in the polymer or by other ingredients in the system. Thus the polymers are stable in the presence of STA•BR•EX™, an oxidizing biocide available from Nalco Chemical Company, One Nalco Center, Naperville, Ill. 60563.

A further advantage of the tagged polymers of this invention is that the spectral properties, i.e. both excitation and emission of the polymers are in the visible wavelength region, thus allowing the use of solid state instrumentation and potentially minimize interferences that generally occur in the UV wavelength region.

EXAMPLES

The following examples are intended to be illustrative of the present invention and to teach one of ordinary skill in the art to make and use the invention. These examples are not intended to limit the invention in any way.

Monomer Example I

Preparation of 8-(4-Vinylbenzyloxy)-1,3,6-Pyrene Trisulfonic Acid, Trisodium Salt (4-VinylBenzyl Pyranine) (4-VBP)

A 100 ml flask was charged with pyranine (2.62 g, 5.0 mmol) and 25 ml of dry dimethylsulfoxide (DMSO) under a nitrogen atmosphere. A 50% sodium hydroxide (6.0 mmol) solution was added, and the reaction mixture stirred for 20 minutes at room temperature. Then, in one portion, 4-vinylbenzyl chloride (0.92 g, 6.0 mmol) was added and stirring at room temperature continued for an additional 6 hours. By-product sodium chloride was filtered off. The DMSO solvent was distilled off at 40° C. under 1.0 torr, and the residue was stirred in 100 ml acetone. The insoluble product was filtered, collected and dried to give the desired 8-(4-vinylbenzyloxy)-1,3,6-pyrene trisulfonic acid, trisodium salt as a yellow solid in over 90% yield.

Monomer Example II

Preparation of 8-Allyloxy-1,3,6-pyrene Trisulfonic Acid, Trisodium Salt (Allyl Pyranine) (AP)

A 100 ml flask was charged with pyranine (2.62 g, 5.0 mmol) and dry DMSO (25 ml) under a nitrogen atmosphere. A 50% sodium hydroxide (6.0 mmol) solution was added, and the reaction mixture stirred for 20 minutes at room temperature. In one portion allyl chloride (0.46 g, 6.0 mmol) was added and stirring at room temperature continued for an additional 6 hours. By-product sodium chloride was filtered off. The DMSO solvent was distilled off at 40° C. under 1.0 torr, and the residue was stirred in 100 ml acetone. The insoluble product was filtered, collected and dried to give the desired 8-(allyloxy)-1,3,6-pyrene trisulfonic acid, trisodium salt as a yellow solid in over 90% yield.

Polymer Example I

Preparation of 0.1 mol %4-VBP/ 49.95 mol % AA/ 49.95 mol % AcAm terpolymer

A 1.0 L reactor equipped with side baffles and nitrogen purge was charged with distilled water (130.34 g, 7.24 mol) and heated to 60° C. with vigorous stirring (800 rpm). While the temperature was maintained at 60° C., a monomer solution (adjusted to pH 5 with 50% aqueous NaOH) consisting of acrylic acid (88.12 g, 1.22 mole), 49.6% aqueous acrylamide (175.16 g, 1.22 mole) and vinyl benzyl pyranine (1.75 g, 2.6 mmol), initiator solution 1 (2.56 g ammonium persulfate in 30 g $H_2O$); and initiator solution 2 (7.74 g sodium metabisulfite in 28.0 g of $H_2O$) were added separately at constant flow rates over a period of two hours. The reaction was then maintained at 60° C. for an additional one hour period ultimately affording an aqueous polymer solution containing approximately 35% solid.

Polymer Example II

Preparation of 0.13 mol % AP/49.935 mol % AA/ 49.935 mol % AcAm terpolymer

A 1.0 L reactor equipped with side baffles and nitrogen purge was charged with distilled water (130.34 g, 7.24 mol) and heated to 60° C. with vigorous stirring (800 rpm). While the temperature was maintained at 60° C., a monomer solution (adjusted to pH 5 with 50% aqueous NaOH) consisting of acrylic acid (88.12 g, 1.22 mole), 49.6% acrylamide (175.16 g, 1.22 mole) and 1 weight percent allyl pyranine, initiator solution 1 (2.56 g ammonium persulfate in 30 g $H_2O$); and initiator solution 2 (7.74 g sodium metabisulfite in 28.0 g of $H_2O$) were added separately at constant flow rates over a period of two hours. The reaction was then maintained at 60° C. for an additional one hour period ultimately affording an aqueous polymer solution containing approximately 35% solid having 1.0 weight percent of allyl pyranine incorporated therein.

Polymer Example III

Sulfomethylation of Tagged Polymer yielding a polymer 0.1 mol % 4-VBP/59.95 mol % acrylic acid/19.95 mol % acrylamide/20 mol % SMA The tagged polymer backbone of Polymer Example I (175.0 g at 35% solid polymer) was combined with sodium metabisulfite (16.9 g, 20.9 mole % sodium bisulfite based on total mer unit) and 37% aqueous formaldehyde (13.8 g, 20.0 mol% based on total mer unit) in a 300 mL pressure reactor. The reactor was sealed and the mixture was heated to 137° C. for 6 hours. Upon cooling, an aqueous polymer solution was obtained whereby approximately 20% of the mer units had been sulfomethylated. The mol percents of the components of the polymer change because about 10% of the acrylamide is changed to acrylic acid.

Polymer Example IV

Synthesis of 0.5 wt% VBP-tagged poly(acrylic acid) About 99.95 mole % Acrylic Acid/0.05 mol 90 VBP A 1.0 L reactor equipped with side baffles and nitrogen purge was charged with distilled $H_2O$ (116.0 g) and heated to 70 ° C. with vigorous stirring (800 rpm). While the temperature was maintained at 70 ° C., a monomer solution (adjusted to a pH of about 3.0 with 50% aqueous NaOH, 11.5 g) consisting of acrylic acid (225.0 g, 3.12 mole), deionized (hereinafter "DI") water (33.5 g), and 1.13 g 4-VBP fluorescent monomer (0.88 g, 1.37 mmol); initiator solution 1 (3.15 g ammonium persulfate in 18.0 g $H_2O$); and initiator solution 2 (31.5 g sodium metabisulfite in 60.0 g of $H_2O$) were added separately at constant flow rates over a period of two hours. The reaction was then maintained at 70° C. for an additional one-hour period ultimately affording an aqueous polymer solution containing approximately 45% solid.

Polymer Example V

Sulfomethylation of VBP tagged poly(acrylic acid)—89.95 mol % AA/10 mol % SMA/0.05 mol %VBP The 4-VBP tagged poly(acrylic acid) solution from Polymer Example IV (160.0 g at 45% solid) was mixed with 37.7 g DI water, 12.9 g of 29% ammonium hydroxide solution (22.0 mole percent of $NH_3$ based on total mer unit) and 28.7 g formaldehyde sodium bisulfite addition compound $HOCH_2SO_3Na$ (20.0 mole percent based on total mer u nit) in a 300 ml Parr reactor. 5.6 g 50% sodium hydroxide was added to adjust the pH to 4.2. The Parr reactor was purged with nitrogen and sealed. The mixture was heated at 137° C. for 6 hours. Upon cooling an aqueous polymer solution (33 % solid) was obtained whereby approximately 10% of the mer units had been sulfomethylated.

Method Example I

Calcium Phosphate Scale Inhibition Test

The scale inhibition properties of the tagged polymer were tested using the following test procedure. A large (20L) stock solution was prepared containing 2500 ppm Ca and 1250 ppm Mg, both as $CaCO_3$. For the 1500 boil test, 1805 mL of this solution was mixed with 32 mL 1000 ppm $H_3PO_4$ solution. The resulting solution was diluted to 2110 mL. 350 mL of the final solution was added to each of six 500 mL Erlenmeyer flasks. Deionized water was added to about the 450 mL mark. The appropriate volume of inhibitor was added, and the flasks were heated to 70° C. in a water bath with stirring.

Once the solutions were at temperature (70° C. or 100° C.), the pH was adjusted to 8.5 (calibrated and measured at temperature) with 0.10 N NaOH and the volume was increased to the calibrated 500 mL mark. The pH was checked frequently to maintain 8.5. Samples were taken after four hours and filtered through a 0.45 micron filter. Then, 100 mL of the unfiltered solution was taken and boiled for 10 minutes in a covered 250 mL Erlenmeyer. The volume was brought back to 100 mL with DI water, and samples were collected and filtered. The concentration of orthophosphate ($PO_4$) was measured spectrophotometrically. The values reported in Table 1 are % inhibition, obtained from percent phosphate. Higher values are indicative of more effective scale inhibitors. The AA/AcAm/SMA terpolymer is known to be an effective calcium phosphate scale inhibitor.

The following results were obtained:

TABLE 1

% Inhibition Data for Polymers

| Treatment | % Inhibition 750 ppm Ca 15 ppm polymer 70° C. | % Inhibition 750 ppm Ca 15 ppm polymer 100° C. | % Inhibition 1500 ppm Ca 20 ppm polymer 70° C. | % Inhibition 1500 ppm Ca 20 ppm polymer 100° C. |
| --- | --- | --- | --- | --- |
| None | 2–4 | 2–4 | 2–4 | 2–4 |
| COMPARATIVE EXAMPLE AA/AcAm/SMA terpolymer[1] | 66–87 | 59–69 | 66–70 | 31–38 |
| COMPARATIVE EXAMPLE Polyacrylic acid[2] | 43 | | | |
| AA/AcAm/SMA/4-VBP[3] | 73–88 | 61–78 | 63–78 | 38–51 |

[1] is a 60 mol % AA/20 mol % AcAm/20 mol % SMA, molecular weight of 15–20,000, can be synthesized using literature reported procedures
[2] is a polyacrylic acid homopolymer with a molecular weight of 5000
[3] is the polymer of Polymer Example III, 59.95 mol % AA/19.95 mol % AcAm/20 mol % SMA/0.1 mol % VBP polymer with a molecular weight of 15–20,000

As can be seen above, the fluorescent tagged polymers of this invention function effectively as scale inhibitors, and function on the same level as AA/AcAm/SMA terpolymer, a known phosphate scale inhibitor.

Method Example II

Oxidizing Biocide Stability Test

A series of solutions containing a tagged polymer of the type noted below were prepared by the addition of the tagged polymer to a simulated cooling water system having a pH of 9 and containing 144 ppm Ca, 49 ppm Mg, 367 ppm alkalinity and 15 ppm phosphonate to stabilize the water and prevent $CaCO_3$ precipitation.

For each of the tagged polymers tested, two amber bottles labeled S and N were employed into each of which there was first introduced 25 ml of the simulated water. To the bottle labeled S was delivered 30 ml of a 1200 ppm stock solution of STA•BR•EX™ bioxide solution, a liquid stabilized bromine solution available from Nalco Chemical Company of Naperville, Ill., to give a 1 ppm total residual oxidant (hereinafter "TRO"). To the second bottle labeled N was added 30 ml of distilled water.

The amount of TRO was measured immediately after the samples were prepared and 24 hours later at the time of fluorescence analysis using a SPEX™ Fluoromax 2 spectrofluorometer.

The % fluorescence (hereinafter "Fl") consumed in the presence of the biocide system was calculated as follows:

$$\% \, Fl \, Consumed = \frac{Intensity \, of \, N \, sample - Intensity \, of \, S \, sample}{Intensity \, of \, N \, sample} \times 100$$

A smaller % Fl consumed value indicates a fluorescent compound that is more stable in the presence of the oxidizing biocide.

The following results were obtained:

TABLE 2

| Polymer | Fluorescent Group | λex, max λem, max | Intensity in Absence of Oxidant (N) | Intensity in Presence of Oxidant (S) | % Fl Consumed |
|---|---|---|---|---|---|
| Sulfomethylated acrylic acid - Acrylamide polymer[1] | VBP | 404 nm 432 nm | 414000 417000 | 397000 399000 | 4% |
| COMPARATIVE EXAMPLE Poly(acrylic acid)[2] | coumarin | 345 nm 425 nm | 605000 610000 | 532000 537000 | 12% |
| COMPARATIVE EXAMPLE Acrylamide - dimethylamino- ethyl acrylate, methyl chloride quat[3] | fluorescein | 380 nm 435 nm | 281000 304000 | 220000 260000 | 18% |
| COMPARATIVE EXAMPLE Acrylamide - Dimethylamino- ethyl acrylate, methyl chloride quat[4] | Quinoxazo- linone | 379 nm 454 nm | 559000 532000 | 370000 310000 | 38% |

[1] is the Polymer of Polymer Example III.
[2] is polyacrylic acid with a fluorescent coumarin moiety (0.15 wt. %) incorporated. This polymer was made a process similar to that described in Polymer Example IV. The molecular weight of the polymer was between about 10,000 and about 20,000 a.m.u.
[3] is a polymer made as follows:
An aqueous monomer phase solution is made by stirring together 0.5 g of 1.69% solution of DMAPMA-5-bromomethylfluorescein quaternary salt in DMF, 12.6 g of a 49.6% aqueous solution of acrylamide, 0.45 g of adipic acid, 1.35 g of NaCl, 9.06 g of a 80.3% aqueous solution of DMAEA.MCQ, 7.84 g of water, and 0.18 g of a 5% aqueous solution of EDTA.4Na$^+$. The components are stirred until in solution.
An oil phase is prepared by heating a mixture of 11.7 g of paraffinic oil (Escaid-110, available from EXXON), 0.94 g of Tween ®61 (POE (4) sorbitan monostearate, available from ICI), and 0.41 g of Span ®80 (sorbitan monooleate, available from ICI) until the surfactants dissolved (55° C.).
The oil-phase is charged into a 125 mL baffled reaction flask, and heated to 45° C. With vigorous stirring, the monomer phase is added dropwise over 2 minutes The resulting mixture is stirred for 65 minutes To the water-in-oil emulsion is added 0.0149 g of AIBN (2,2'-azobis(isobutyronitrile), available from DUPONT) and 0.0014 g of AIVN (2,2'-azobis(2,4-dimethylvaleronitrile), available from DUPONT). The polymerization is carried out under a$N_2$ atmosphere for 3 hours and 45 minutes at 45° C., then 60° C. for one hour. A reduced specific viscosity (hereinafter "RSV") of 16.7 dl/g (1M $NaNO_3$, 450 ppm, 30° C.) is measured for an aqueous solution of the resulting polymer.
Incorporation of the fluorescent monomer into the high molecular weight fractions of the polymer is verified chromatographically, using a 20 cm x 7.8 mm ID column packed in-house with Waters Accell Plus QMA packing. A mobile phase containing 1% acetic acid, 0.10M sodium sulfate and 0.01M tetrabutylammonium hydrogen sulfate is used to separate tagged high molecular weight polymer from low molecular weight polymer and residual fluorescent monomer, if present.A waters 410 refractive index detector and a Shimadzu RF-530 fluorescence detector (EX/EM 438/518) are used simultaneously to quantitate incorporation and determine fluorescence relative to untagged controls.

TABLE 2-continued

| Polymer | Fluorescent Group | λex, max λem, max | Intensity in Absence of Oxidant (N) | Intensity in Presence of Oxidant (S) | % FI Consumed |
|---|---|---|---|---|---|

The polymer was separated from the emulsion by adding the polymeric emulsion dropwise to a solution of 9:1 acetone:methanol. The polymer was filtered using filter paper, rinsed with acetone and air-dryed. 100 mg of the polymer precipitate were added to a small amount of deionized water. This solution was put into a blender and sheared for 7 minutes at high speed. The resulting solution was diluted to 100 ml in a volumetric flask with deionized water. This 1000 ppm stock solution was further diluted for testing. Polymers were tested at the 10 ppm polymer level.

[4] Is a polymer made as follows:
An aqueous monomer phase solution is made by stirring together 0.025 g (0.052 mmol) of the DMAPMA-3-(bromomethyl-6,7-dimethoxy-1-methyl-2(1H0-quinoxazolinone quaternary salt 12.6 g of a 49.6% aqueous solution of acrylamide, 0.45 g of adipic acid, 1.35 g of NaCl, 9.06 g of a 80.3% aqueous solution of DMAEA.MCQ, 7.84 g of water, and 0.18 g of a 5% aqueous solution of EDTA.4Na$^+$. The components are stirred until in solution.
An oil phase is prepared by heating a mixture of 11.7 g of paraffinic oil (Escaid-110, available from EXXON), 0.94 g of Tween ®61 (POE (4) sorbitan monostearate, available from ICI), and 0.41 g of Span ®80 (sorbitan monooleate, available from ICI) until the surfactants dissolved at about 55° C.
The oil-phase is charged into a 125 mL baffled reaction flask, and heated to 45° C. With vigorous stirring, the monomer phase is added dropwise over 2 minutes The resulting mixture is stirred for 65 minutes. To the water-in-oil emulsion is added 0.0149 g of AIBN (available from DUPONT) and 0.0014 g of AIVN (also available from DUPONT). The polymerization is carried out under a $N_2$ atmosphere for 3 hr and 50 minutes at 45° C., then 60° C. for one hour. A RSV of 12.1 dl/g (1M NaO3, 450 ppm, 30° C.) is measured for a solution of the resulting polymer.
The polymer was separated from the emulsion by adding the polymeric emulsion dropwise to a solution of 9:1 acetone:methanol. The polymer was filtered using filter paper, rinsed with acetone and air-dryed. 100 mg of the polymer precipitate was added to a small amount of deionized water. This solution was put into a blender and sheared for 7 minutes at high speed. The resulting solution was diluted to 100 ml in a volumetric flask with deionized water. This 1000 ppm stock solution was further diluted for testing. Polymers were tested at the 10 ppm polymer level.

When using the fluorescent-tagged polymer as a compound of a scale-inhibitor product in a cooling water system, the only decrease or loss of fluorescence signal from the polymer should be due to loss of the polymer under scaling conditions. When identifying a scaling event as the reason for a loss of fluorescence it is undesirable for the level of fluorescence to also vary based on pH changes, other components present in the cooling water system or from oxidizing biocides such as the STA•BR•EX biocide system.

If the amount consumed by an oxidizing biocide is less than 10% of the signal, then the fluorescent tagged polymer can be used in an industrial water system. Although a small amount (4%) of the VBP tagged polymer is consumed in the presence of 1 ppm STABREX biocide, the amount consumed is less than the other polymers tested under the above conditions.

Thus, the results given above indicate that the VBP-tagged polymer is sufficiently stable to be used in industrial water systems where oxidizing biocides are present.

The specific examples herein disclosed are to be considered as being primarily illustrative. Various changes beyond those described will, no doubt, occur to those skilled in the art; and such changes are to be understood as forming a part of this invention insofar as they fall within the spirit and scope of the appended claims.

That which is claimed is:

1. A process for the preparation of 8-(3- or 4-vinylbenzyloxy)-1,3,6-pyrene trisulfonic acid which comprises reacting pyranine with either 3- or 4-vinylbenzyl chloride in an organic solvent selected from the group consisting of methanol, dimethyl formamide, methyl pyrrolidinone and dimethylsulfoxide.

2. A process for the preparation of 8-(allyloxy)-1,3,6-pyrene trisulfonic acid which comprises reacting pyranine with allyl chloride in an organic solvent selected from the group consisting of methanol, dimethyl formamide, methyl pyrrolidinone and dimethylsulfoxide.

3. A fluorescent pyranine-tagged polymer, selected from the group consisting of:

$$A_xB_y \qquad \text{I)}$$

where x+y=100; where

A is a fluorescent monomer selected from the group consisting of compounds of the formula:

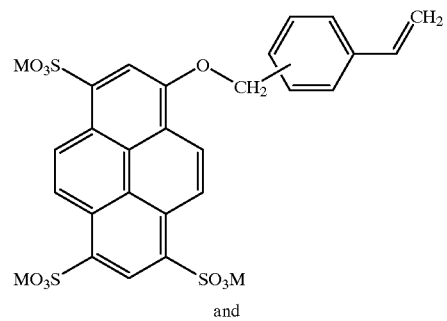

and

-continued

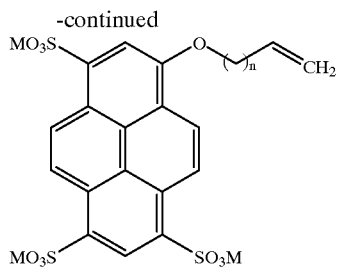

wherein M is selected from the group consisting of hydrogen, sodium, potassium, cesium, rubidium, lithium and ammonium, and n is selected from the group consisting of 1, 2, 3, 4, 6 and 9;

x is from about 0.001 to about 1 mol %; and
  B is selected from the group consisting of acrylic acid and salts, methacrylic acid and salts, maleic acid and salts, maleic anhydride, acrylamide, crotonic acid and salts, and
y is from about 99.000 to about 99.999 mol %;

$$A_xB_jC_k \qquad \text{II)}$$

where x+j+k=100;
A is as defined above; x is as defined above;
B is as defined above; j is from about 1 to about 98 mol %; and
C is selected from the group consisting of methacrylic acid and salts, maleic acid and salts, maleic anhydride, crotonic acid and salts, itaconic acid and salts, acrylamide, methacrylamide, 2-acrylamido-2-methylpropanesulfonic acid and salts, polyethylene glycol monomethacrylate, vinyl phosphonic acid and salts, styrene sulfonic acid and salts, vinyl sulfonic acid and salts, 3-allyloxy-2-hydroxypropane sulfonic acid and salts, N-alkyl (meth)acrylamide, t-butyl (meth) acrylate, N-alkyl (meth)acrylate, N-alkanol-N-alkyl (meth)acrylate, vinyl acetate, 2-Hydroxy N-alkyl (meth)acrylate, alkyl vinyl ether, alkoxyethyl acrylate, N-alkanol (meth)acrylamide, N,N-dialkyl(meth) acrylamide and 1-vinyl-2-pyrrolidinone;
k is from about 1.999 to about 98 mol %;

$$A_xB_mD_q \qquad \text{III)}$$

where x+m+q=100;
A is as defined above; x is as defined above;
B is as defined above; m is from about 1 to about 95 mol %;
D is selected from the group consisting of sulfomethylacrylamide and sulfoethylacrylamide; q is from about 4.999 to about 40 mol %; and $$A_xB_rC_sD_t \qquad \text{IV)}$$

where x+r+s+t=100;
A is as defined above, x is from about 0.001 to about 1 mol %
B is as defined above, r is from about 1 to about 89.999 mol %
C is as defined above, s is from about 1 to about 89.999 mol % and D is as defined above, t is from about 5 to about 40 mol %.

4. A fluorescent pyranine-tagged polymer of claim 3 wherein said fluorescent monomer is 8-(3-vinylbenzyloxy)-1,3,6-pyrene trisulfonic acid.

5. A fluorescent pyranine-tagged polymer of claim 3 wherein said fluorescent monomer is 8-(4-vinylbenzyloxy)-1,3,6-pyrene trisulfonic acid.

6. A fluorescent pyranine-tagged polymer of claim 3 wherein said fluorescent monomer is a mixture of 8-(3-vinylbenzyloxy)-1,3,6-pyrene trisulfonic acid and 8-(4-vinylbenzyloxy)-1,3,6-pyrene trisulfonic acid.

7. A fluorescent pyranine-tagged polymer of claim 3 wherein said fluorescent monomer is 8-(allyloxy)-1,3,6-pyrene trisulfonic acid.

8. A fluorescent pyranine-tagged polymer of claim 3 wherein said fluorescent monomer is present in an amount in the range of from about 0.001 to about 1.0 mol %.

9. The polymer of claim 3 wherein the molecular weight is between about 500 a.m.u. and about 200,000 a.m.u.

10. A method for maintaining the desired amount of pyranine-tagged polymer in an industrial water system comprising the steps of:

a) adding a pyranine-tagged polymer selected from the group consisting of:

$$A_xB_y \qquad \text{I)}$$

where x+y=100; where
A is a fluorescent monomer selected from the group consisting of compounds of the formula:

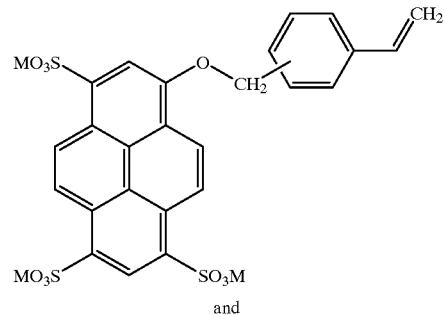

and

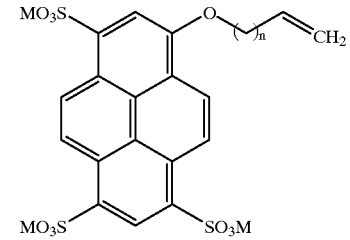

wherein M is selected from the group consisting of hydrogen, sodium, potassium, cesium, rubidium, lithium and ammonium, and n is selected from the group consisting of 1, 2, 3, 4, 6 and 9;

x is from about 0.001 to about 1 mol %; and
  B is selected from the group consisting of acrylic acid and salts, methacrylic acid and salts, maleic acid and salts, maleic anhydride, acrylamide, crotonic acid and salts, and y is from about 99.000 to about 99.999 mol %;

$A_xB_jC_k$      II)

where x+j+k=100;
A is as defined above; x is as defined above;
B is as defined above; j is from about 1 to about 98 mol %; and
C is selected from the group consisting of methacrylic acid and salts, maleic acid and salts, maleic anhydride, crotonic acid and salts, itaconic acid and salts, acrylamide, methacrylamide, 2-acrylamido-2-methylpropanesulfonic acid and salts, polyethylene glycol monomethacrylate, vinyl phosphonic acid and salts, styrene sulfonic acid and salts, vinyl sulfonic acid and salts, 3-allyloxy-2-hydroxypropane sulfonic acid and salts, N-alkyl (meth)acrylamide, t-butyl (meth)acrylate, N-alkyl (meth)acrylate, N-alkanol-N-alkyl(meth)acrylate, vinyl acetate, 2-Hydroxy N-alkyl(meth)acrylate, alkyl vinyl ether, alkoxyethyl acrylate, N-alkanol (meth)acrylamide, N,N-dialkyl(meth)acrylamide and 1-vinyl-2-pyrrolidinone;
k is from about 1.999 to about 98 mol %;

$A_xB_mD_q$      III)

where x+m+q=100;
A is as defined above; x is as defined above;
B is as defined above; m is from about 1 to about 95 mol %;
D is selected from the group consisting of sulfomethylacrylamide and Sulfoethylacrylamide; q is from about 4.999 to about 40 mol %; and $A_xB_rC_sD_t$      IV)

where x+r+s+t=100;
A is as defined above; x is from about 0.001 to about 1 mol %;
B is as defined above; r is from about 1 to about 89.999 mol %;
C is as defined above; s is from about 1 to about 89.999 mol %;
D is as defined above; t is from about 5 to about 40 mol %;
to water such that a desired concentration of said pyranine-tagged polymer is present in said water, b) using a fluorometer to detect the fluorescent signal of said pyranine-tagged polymer;
c) converting the fluorescent signal of the polymer to the concentration of said pyranine-tagged polymer;
d) adjusting the concentration of said pyranine-tagged polymer according to what the desired concentration is for said pyranine-tagged polymer in the industrial water system.

11. A method for maintaining the desired amount of pyranine-tagged polymer in an industrial water system comprising the steps of:

a) adding an inert tracer and a pyranine-tagged polymer selected from the group consisting of:

$A_xB_y$      I)

where x+y=100; where
A is a fluorescent monomer selected from the group consisting of compounds of the formula:

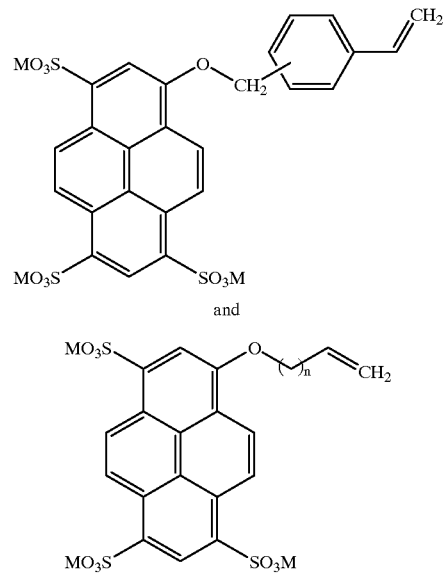

wherein M is selected from the group consisting of hydrogen, sodium, potassium, cesium, rubidium, lithium and ammonium, and
n is selected from the group consisting of 1, 2, 3, 4, 6 and 9;
x is from about 0.001 to about 1 mol %; and
B is selected from the group consisting of acrylic acid and salts, methacrylic acid and salts, maleic acid and salts, maleic anhydride, acrylamide, crotonic acid and salts, and
y is from about 99.000 to about 99.999 mol %;

$A_xB_jC_k$      II)

where x+j+k=100;
A is as defined above; x is as defined above;
B is as defined above; j is from about 1 to about 98 mol %; and
C is selected from the group consisting of methacrylic acid and salts, maleic acid and salts, maleic anhydride, crotonic acid and salts, itaconic acid and salts, acrylamide, methacrylamide, 2-acrylamido-2-methylpropanesulfonic acid and salts, polyethylene glycol monomethacrylate, vinyl phosphonic acid and salts, styrene sulfonic acid and salts, vinyl sulfonic acid and salts, 3-allyloxy-2-hydroxypropane sulfonic acid and salts, N-alkyl (meth)acrylamide, t-butyl (meth)acrylate, N-alkyl (meth)acrylate, N-alkanol-N-alkyl(meth)acrylate, vinyl acetate, 2-Hydroxy N-alkyl(meth)acrylate, alkyl vinyl ether, alkoxyethyl acrylate, N-alkanol (meth)acrylamide, N,N-dialkyl(meth)acrylamide and 1-vinyl-2-pyrrolidinone;
k is from about 1.999 to about 98 mol %;

$A_xB_mD_q$      III)

where x+m+q=100;
A is as defined above; x is as defined above;
B is as defined above; m is from about 1 to about 95 mol %;
D is selected from the group consisting of sulfomethylacrylamide and sulfoethylacrylamide; q is from about 4.999 to about 40 mol %; and $A_xB_rC_sD_t$      IV)

where x+r+s+t=100;

A is as defined above; x is from about 0.001 to about 1 mol %;

B is as defined above; r is from about 1 to about 89.999 mol %;

C is as defined above; s is from about 1 to about 89.999 mol %;

D is as defined above; t is from about 5 to about 40 mol %;

to water such that a desired concentration of said pyranine-tagged polymer is present in said water, b) using a fluorometer to detect the fluorescent signals of the inert tracer and the pyranine-tagged polymer;

c) converting the fluorescent signals of the inert tracer and the pyranine-tagged polymer to the concentration of the inert tracer and the pyranine-tagged polymer;

d) adjusting the concentration of said pyranine-tagged polymer according to what the desired concentration is for said pyranine-tagged polymer in the industrial water system.

12. A fluorescent monomer selected from the group consisting of 8-(3-vinylbenzyloxy)-1,3,6-pyrene trisulfonic acid and its sodium, potassium, cesium, rubidium, lithium and ammonium salts.

13. A fluorescent monomer selected from the group consisting of 8-(4-vinylbenzyloxy)-1,3,6-pyrene trisulfonic acid and its sodium, potassium, cesium, rubidium, lithium and ammonium salts.

14. A fluorescent monomer selected from the group consisting of 8-(allyloxy)-1,3,6-pyrene trisulfonic acid and its sodium, potassium, cesium, rubidium, lithium and ammonium salts.

15. A fluorescent pyranine-tagged polymer, selected from the group consisting of:

$A_xB_y$      I)

where x+y=100; where

A is a fluorescent monomer selected from the group consisting of compounds of the formula:

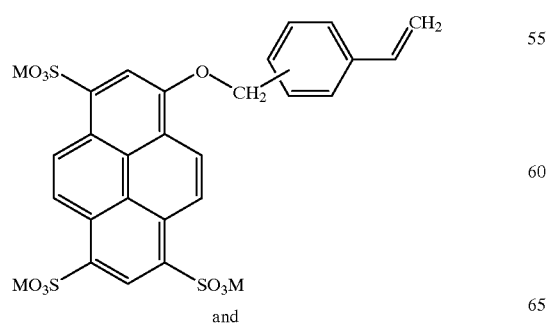

and

-continued

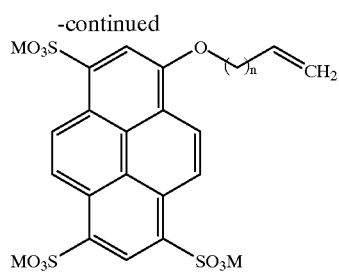

wherein M is selected from the group consisting of hydrogen, sodium, potassium, cesium, rubidium, lithium and ammonium, and n is selected from the group consisting of 1, 2, 3, 4, 6 and 9;

x is from about 0.001 to about 1 mol %; and

B is selected from the group consisting of acrylic acid and its salts, and y is from about 99.000 to about 99.999 mol %;

$A_xB_jC_k$      II)

where x++k=100;

A is as defined above; x is as defined above;

B is as defined above; j is from about 1 to about 98 mol %; and

C is acrylamide; k is from about 1.999 to about 98 mol %;

$A_xB_mD_q$      III)

where x+m+q=100;

A is as defined above; x is as defined above;

B is as defined above; m is from about 1 to about 95 mol %;

D is selected from the group consisting of sulfomethylacrylamide and sulfoethylacrylamide; q is from about 4.999 to about 40 mol %; and $A_xB_rC_sD_t$      IV)

where x+r+s+t=100;

A is as defined above, x is from about 0.001 to about 1 mol %

B is as defined above, r is from about 1 to about 89.999 mol %.

C is as defined above, s is from about 1 to about 89.999 mol % and

D is as defined above, t is from about 5 to about 40 mol %.

16. A fluorescent pyranine-tagged polymer, selected from the group consisting of:

$A_xB_y$      I)

where x+y=100; where

A is a fluorescent monomer selected from the group consisting of compounds of the formula:

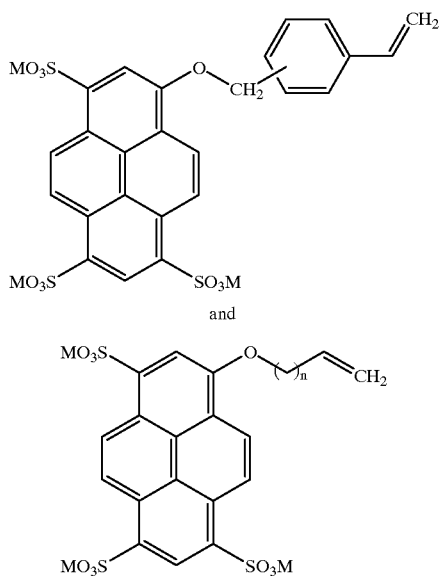

wherein M is selected from the group consisting of hydrogen, sodium, potassium, cesium, rubidium, lithium and ammonium, and n is selected from the group consisting of 1, 2, 3, 4, 6 and 9;

x is from about 0.001 to about 1 mol %; and

B is selected from the group consisting of acrylic acid and its salts, and y is from about 99.000 to about 99.999 mol %;

$$A_xB_jC_k \quad \text{III)}$$

where x+j+k=100;

A is as defined above; x is as defined above;

B is as defined above; j is from about 1 to about 98 mol %; and

C is acrylamide; k is from about 1.999 to about 98 mol %;

$$A_xB_mD_q \quad \text{III)}$$

where x+m+q=100;

A is as defined above; x is as defined above;

B is as defined above; m is from about 1 to about 95 mol %;

D is sulfomethylacrylamide; q is from about 4.999 to about 40 mol %; and $$A_xB_rC_sD_t \quad \text{IV)}$$

where x+r+s+t=100;

A is as defined above, x is from about 0.001 to about 1 mol %;

B is as defined above, r is from about 1 to about 89.999 mol %;

C is as defined above, s is from about 1 to about 89.999 mol % and

D is as defined above, t is from about 5 to about 40 mol %.

17. The use of a pyranine-tagged polymer as a scale-inhibitor in an industrial water system comprising the steps of:

i) providing an industrial water system susceptible to unwanted scaling; and ii) adding to the water of said industrial water system from about 1 ppm to about 30 ppm of a scale inhibitor;

wherein said scale inhibitor is a pyranine-tagged polymer selected from the group consisting of compounds of the formula:

$$A_xB_y \quad \text{I)}$$

where x+y=100; where

A is a fluorescent monomer selected from the group consisting of compounds of the formula:

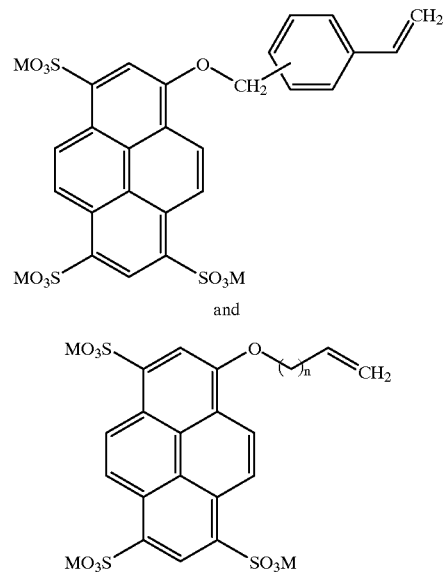

wherein M is selected from the group consisting of hydrogen, sodium, potassium, cesium, rubidium, lithium and ammonium, and n is selected from the group consisting of 1, 2, 3, 4, 6 and 9;

x is from about 0.001 to about 1 mol %; and

B is selected from the group consisting of acrylic acid and salts, methacrylic acid and salts, maleic acid and salts, maleic anhydride, acrylamide, crotonic acid and salts, and y is from about 99.000 to about 99.999 mol %;

$$A_xB_jC_k \quad \text{II)}$$

where x+j+k=100;

A is as defined above; x is as defined above;

B is as defined above; j is from about 1 to about 98 mol %; and

C is selected from the group consisting of methacrylic acid and salts, maleic acid and salts, maleic anhydride, crotonic acid and salts, itaconic acid and salts, acrylamide, methacrylamide, 2-acrylamido-2-methylpropanesulfonic acid and salts, polyethylene glycol monomethacrylate, vinyl phosphonic acid and salts, styrene sulfonic acid and salts, vinyl sulfonic acid and salts, 3-allyloxy-2-hydroxypropane sulfonic acid and salts, N-alkyl (meth)acrylamide, t-butyl (meth)acrylate, N-alkyl (meth)acrylate, N-alkanol-N-alkyl(meth)acrylate, vinyl acetate, 2-Hydroxy N-alkyl(meth)acrylate, alkyl vinyl ether, alkoxyethyl acrylate, N-alkanol (meth)acrylamide, N,N-dialkyl(meth)acrylamide and 1-vinyl-2-pyrrolidinone;

k is from about 1.999 to about 98 mol %;

$$A_xB_mD_q \quad \text{III)}$$

where x+m+q=100;
A is as defined above; x is as defined above;
B is as defined above; m is from about 1 to about 95 mol %;
D is selected from the group consisting of sulfomethylacrylamide and sulfoethylacrylamide; q is from about 4.999 to about 40 mol %; and $$A_xB_rC_sD_t \quad \text{IV)}$$

where x+r+s+t=100;
A is as defined above; x is from about 0.001 to about 1 mol %;
B is as defined above; r is from about 1 to about 89.999 mol %;
C is as defined above; s is from about 1 to about 89.999 mol %; and
D is as defined above; t is from about 5 to about 40 mol %.

* * * * *